United States Patent
Ayres et al.

(10) Patent No.: US 7,926,069 B2
(45) Date of Patent: Apr. 12, 2011

(54) APPARATUS, SYSTEM, AND METHOD FOR EXTENDING A DEVICE DRIVER TO FACILITATE A NETWORK CONNECTION TO A REMOTE EVENT MANAGER

(75) Inventors: James Francis Ayres, Tucson, AZ (US); Yun Mou, Tucson, AZ (US); Anh Tuan Nguyen, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1081 days.

(21) Appl. No.: 11/679,065

(22) Filed: Feb. 26, 2007

(65) Prior Publication Data
US 2008/0209448 A1 Aug. 28, 2008

(51) Int. Cl.
- G06F 3/00 (2006.01)
- G06F 9/44 (2006.01)
- G06F 9/46 (2006.01)
- G06F 13/00 (2006.01)

(52) U.S. Cl. .............. 719/321; 719/318
(58) Field of Classification Search .......... 719/318, 719/321; 709/277
See application file for complete search history.

(56) References Cited

U.S. PATENT DOCUMENTS

| | | | |
|---|---|---|---|
| 6,457,142 B1* | 9/2002 | Klemm et al. | 714/38 |
| 6,857,069 B1 | 2/2005 | Rissmeyer et al. | 713/2 |
| 6,915,524 B2 | 7/2005 | Crowley et al. | 719/321 |
| 7,051,222 B2* | 5/2006 | Wyatt et al. | 713/323 |
| 7,401,338 B1* | 7/2008 | Bowen et al. | 719/328 |
| 2003/0145131 A1 | 7/2003 | Pelly et al. | 709/326 |
| 2003/0149763 A1* | 8/2003 | Heitman et al. | 709/224 |
| 2004/0085977 A1 | 5/2004 | Guar | 370/412 |
| 2005/0283545 A1 | 12/2005 | Zur et al. | 710/36 |
| 2006/0013162 A1 | 1/2006 | Lim | 370/328 |
| 2006/0041894 A1 | 2/2006 | Cheng et al. | 719/326 |
| 2006/0281630 A1* | 12/2006 | Bailey et al. | 502/200 |

OTHER PUBLICATIONS

Girish, M. et al ... "Evaluation of Advanced TCP Stacks in the ISCSI Environment Using Simulation Model" Apr. 2005, Twenty-Second IEEE/Thirteenth NASA Goddard Conference on Mass Storage Systems and Technologies.

Hyotaek, L. et al ... "Design and Implementation of ISCSI-Based Virtual Storage System for Mobile Health Care" Jun. 2005, 7th International Workshop on Enterprise Networking and Computing in Healthcare Industry.

(Continued)

*Primary Examiner* — Diem K Cao
(74) *Attorney, Agent, or Firm* — Kunzler Needham Massey & Thorpe

(57) ABSTRACT

An apparatus, system, and method are disclosed for providing a network interface to a small computer system interface ("SCSI") storage device driver. The method includes detecting an event in one of a storage device and a SCSI device driver of the storage device and comparing an event identifier associated with the event to a list of event identifiers. The method includes suspending an application in communication with the storage device through the SCSI device driver and sending a request associated with the event to a remote event manager over a transaction control protocol/Internet protocol ("TCP/IP") connection, each in response to the event identifier matching a listed event identifier. The method includes receiving a response related to the event from the remote event manager over a TCP/IP connection. The method includes resuming the application after sending the response to the storage device through the SCSI device driver or failing the application.

20 Claims, 6 Drawing Sheets

OTHER PUBLICATIONS

Yamaguchi, S. et al . . . "Trace System of ISCSI Storage Access and Performance Improvement" Apr. 2005, Database Systems for Advanced Applications.

Yamaguchi, S. et al . . . "Trace System of ISCSI Storage Access" Feb. 2005, The 2005 Symposium on Applications and the Internet.

Palekar, A. et al . . . "Design and Implementation of a Software Prototype for Storage Area Network Protocol Evaluation" Aug. 2001, IASTED International Conference: Parallel and Distributed Computing Systems.

Simitci, H. et al . . . "Evaluation of SCSP Over TCP/IP and SCSI Over Fibre Channel Connections" Aug. 2001, HOT 9 Interconnects: Symposium on High Performance Interconnects.

Voruganti, K. et al . . . "An Analysis of Three Gigabit Networking Protocols for Storage Area Networks" Apr. 2001, The 2001 IEEE International Performance, Computing, and Communications Conference.

Keener, DS et al . . . "Transparent Target Mode for a Small Computer System Inteface" IBM TDB n3a 08-90.

Ming, W. et al . . . "The Design and Implementation of ISCSI Technology in the Volume Holographic Storage System" Sep. 2003, Proceedings of the SPIE, The International Society for Optical Engineering, vol. 5135 No. 1.

Snively, R. "Implementing a Fibre Channel SCSI Transport" Mar. 1994, Proceedings of COMPCON ' 94.

* cited by examiner

APPARATUS, SYSTEM, AND METHOD FOR EXTENDING A DEVICE DRIVER TO FACILITATE A NETWORK CONNECTION TO A REMOTE EVENT MANAGER

BACKGROUND OF THE INVENTION

1. Field of the Invention

This invention relates to a network connection of a Small Computer System Interface ("SCSI") storage device, and more particularly relates to extending a SCSI device driver to communicate with a remote event manager over a network using a transmission control protocol/Internet protocol ("TCP/IP") connection in response to an event generated by the storage device or SCSI device driver.

2. Description of the Related Art

SCSI is a standard interface and command set for transferring data between devices on both internal and external computer buses. SCSI is used most often for storage devices, such as hard disk drives ("HDD"), optical drives, and tape storage devices, but may also connect other devices such as printers, scanners, digital video disk ("DVD") drives, etc. SCSI is often used on high-performance workstations and servers. A redundant array of inexpensive/independent disks ("RAID") array typically uses SCSI. A storage area network ("SAN") often includes RAID arrays and other configurations of storage devices and may communicate using SCSI.

A host computer may be connected to an external SCSI storage device and may run an application that interfaces with the storage device. The external storage device may be a standalone device or may be part of a SAN. The application running on the host may write data, update data, read data, etc. to and from the storage device through a SCSI device driver.

More functionality is being added into SCSI storage devices. In some of the new SCSI functions, storage devices may request data dynamically from other entities. For example, an encryption-enabled storage device may require an encryption key before data can be written or retrieved from the storage device. An application engaging the SCSI storage device may not have information required by the SCSI device and, as a result, may fail.

Remote error logging and error handling may also be desirable for a SCSI storage device. Remote error logging and handling and information requests and responses over a network with a remote event manager are not currently available through a SCSI device driver. A hardware solution may be possible to add a networking capability to the SCSI storage device to allow a network connection to a remote event manager. While a hardware solution may be possible, modification of hardware may be expensive and would not accommodate legacy SCSI storage devices.

SUMMARY OF THE INVENTION

From the foregoing discussion, it should be apparent that a need exists for an apparatus, system, and method to extend a SCSI device driver to facilitate a network connection to a remote event manager. Beneficially, such an apparatus, system, and method would allow remote error logging and handling and would allow a remote event manager to supply needed information to a SCSI storage device through a SCSI device driver.

The present invention has been developed in response to the present state of the art, and in particular, in response to the problems and needs in the art that have not yet been fully solved by currently available storage device networking capabilities. Accordingly, the present invention has been developed to provide an apparatus, system, and method for providing a network interface to a SCSI storage device driver that overcome many or all of the above-discussed shortcomings in the art.

A method of the present invention is also presented for providing a network interface to a SCSI storage device driver. The method in the disclosed embodiments substantially includes the steps necessary to carry out the functions presented below with respect to the operation of the described apparatus and system. In one embodiment, the method includes detecting an event in one of a storage device and a SCSI device driver of the storage device and comparing an event identifier associated with the event to a list of event identifiers. The method includes suspending an application in communication with the storage device through the SCSI device driver and sending a request associated with the event to a remote event manager over a TCP/IP connection, each in response to the event identifier matching a listed event identifier. The method includes receiving a response related to the event from the remote event manager over a TCP/IP connection. The method includes sending the response to the storage device through the SCSI device driver and then resuming the application or failing the application.

In one embodiment, the event is in response to a communication between the application and one of the storage device and the SCSI device driver. In another embodiment, the request includes an error message. In another embodiment, the response from the remote event manager includes a response to the error message. In another embodiment, the request includes an information request for information unavailable from the SCSI device driver. In yet another embodiment, the information request includes a request for an encryption key and the remote event manager includes an encryption key manager capable of supplying the encryption key to the storage device.

In one embodiment, the listed event identifier includes an entry in a table. In another embodiment, sending request associated with the event to a remote event manager also includes encoding the request in a format compatible with TCP/IP. In another embodiment, sending a request and receiving a response from the remote event manager include sending a plurality of requests and receiving a plurality of corresponding instructions and data from the remote event manager over a TCP/IP connection, where the instructions and data directed to the storage device through the SCSI device driver. In yet another embodiment, receiving a plurality of instructions and data from the remote event manager includes receiving either an instruction to resume the application or an instruction to fail the application.

The apparatus to provide a network interface to a SCSI storage device driver is provided with a plurality of modules configured to functionally execute the necessary steps of detecting an event, suspending an application if the event is a listed event, requesting information from a remote event manager, receiving a response, and either resuming or failing the application. These modules in the described embodiments include a detection module that detects an event in one of a storage device and a SCSI device driver of the storage device and a comparison module that compares an event identifier associated with the event to a list of event identifiers. A request module suspends an application communicating with the storage device through the SCSI device driver and to sends a request associated with the event to a remote event manager over a TCP/IP connection, each in response to the comparison module matching the event identifier with a listed event identifier. A receiver module receives a response related to the event from the remote event manager over a TCP/IP connection. A resume/fail module resumes the application after sending the response to the storage device through the SCSI device driver or to fails the application, each in response to the response received from the remote event manager.

The apparatus, in one embodiment, includes a TCP/IP manager that receives the request in a SCSI format and to send the request to the remote event manager in a TCP/IP format. In another embodiment, the request module retrieves a network address of the event handling file from a user configuration file. In yet another embodiment, the SCSI device driver includes an event handler that includes the detection module and the comparison module.

A system of the present invention is also presented to provide a network interface to a SCSI storage device driver. The system may be embodied by a computer network, a storage device, a remote event manager, and a host in communication with the storage device through a SCSI device driver and in communication with the remote event manager through the computer network. In particular, the host, in one embodiment, includes a detection module that detects an event in one of the storage device and the SCSI device driver and a comparison module that compares an event identifier associated with the event to a list of event identifiers. The host includes a request module that suspends an application in communication with the storage device through the SCSI device driver and sends a request associated with the event to the remote event manager over a TCP/IP connection, each in response to the comparison module matching the event identifier with a listed event identifier. The host includes a receiver module that receives a response related to the event from the remote event manager over a TCP/IP connection. The host includes a resume/fail module that resumes the application after sending the response to the storage device through the SCSI device driver or fails the application, each in response to the response received from the remote event manager.

In one embodiment, the host communicates with the storage device over a fiber channel protocol ("FCP") connection. In another embodiment, the host communicates with the storage device over an Internet SCSI ("iSCSI") connection. In another embodiment, the storage device is part of a storage area network. In another embodiment, the application resides on the host or a computer in communication with the host. In yet another embodiment, the remote event manager resides on the host.

A method of the present invention is also presented for deploying network interface computer code for providing a network interface to a SCSI storage device driver. The method in the disclosed embodiments substantially includes the steps necessary to carry out the functions presented above with respect to the operation of the described apparatus and system. In one embodiment, the method includes determining customer requirements for extending a device driver to facilitate a network connection to a remote event manager and deploying network interface computer code. The network interface computer code includes detecting an event in one of a storage device and a SCSI device driver of the storage device and comparing an event identifier associated with the event to a list of event identifiers. The network interface computer code includes suspending an application in communication with the storage device through the SCSI device driver and sending a request associated with the event to the remote event manager over a TCP/IP connection, each in response to the event identifier matching a listed event identifier. The network interface computer code includes receiving a response related to the event from the remote event manager over a TCP/IP connection and one of sending the response to the storage device through the SCSI device driver, resuming the application, and failing the application.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
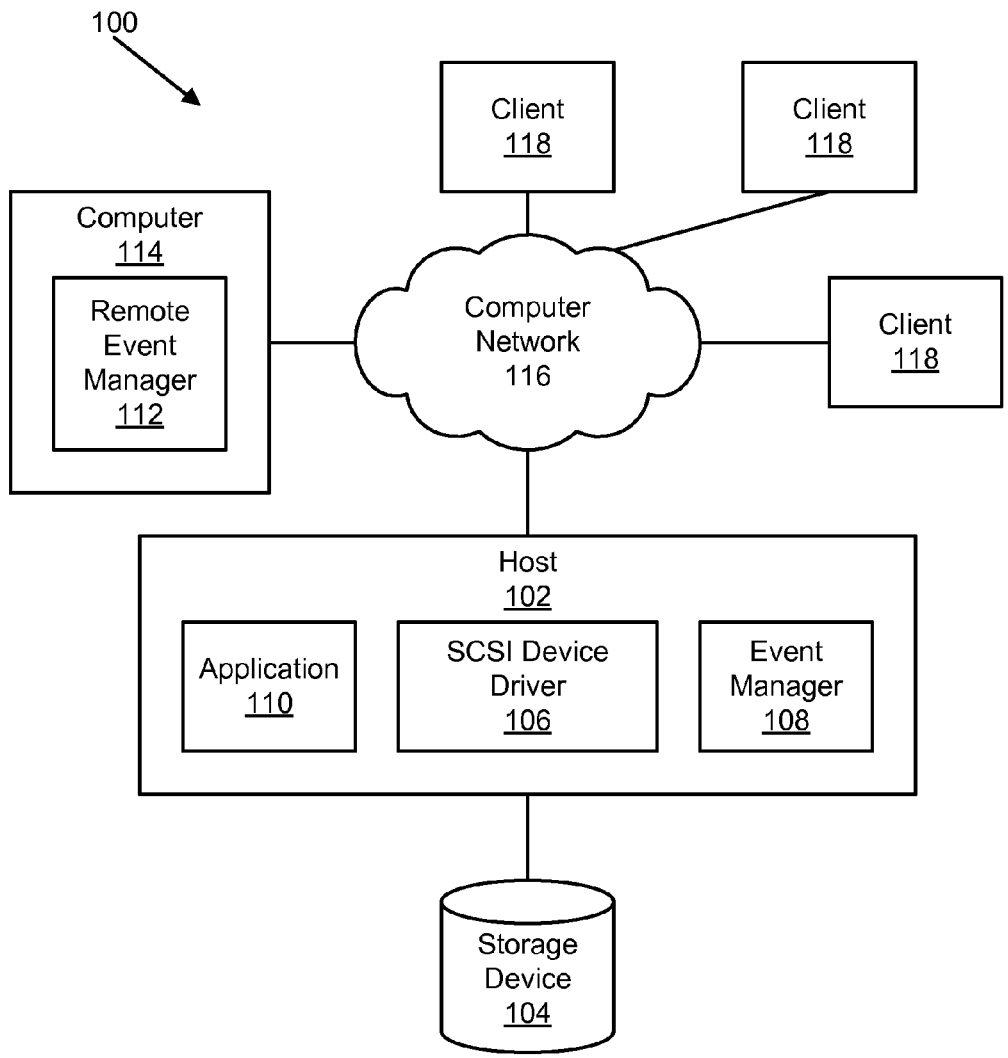
FIG. 1 is a schematic block diagram illustrating one embodiment of a system for providing a network interface to a SCSI device driver in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for providing a network interface to a SCSI device driver in accordance with the present invention. The system 100 includes a host computer 102 in communication with a storage device 104 through a SCSI device driver 106. The host 102 also includes an event manager 108 and an application 110. The system 100 includes a remote event manager 112 located on a computer 114 and the remote event manager 112 communicates with the host 102 over a computer network 116. Other client computers 118 may also communicate with the host 102 over the computer network 116. The components listed above are described below.

The system includes a host computer 102 configured to communicate with a storage device 104 through a SCSI device driver 106. The host 102 may be a workstation, a server, a mainframe computer, a personal computer, etc. The host 102 includes one or more processors, memory, and one or more input/output ("I/O") devices. The memory on the host 102 may be random access memory ("RAM"), non-volatile memory, flash memory, etc. The host 102 may include one or more data storage devices, such as a hard disk drive, DVD drive, compact disk ("CD") drive, and the like. The host 102 communicates with other devices and computers through one or more I/O devices. For example, the host 102 may include an Ethernet interface for connection to the computer network 116, a network adapter for a fiber channel connection to the storage device 104, a wireless network adapter, etc.

The host 102 is responsive to at least one application 110. In one embodiment, the host 102 runs the application 110. The host 102 may service requests by a client 118 to the application 110. In another embodiment, the host 102 acts as a server to another client 118 running the application 110 and responds to requests from the application 110 running on the client 118. The host 102, and in one embodiment the event manager 108 running on the host 102, communicate with the remote event manager 112 over a transmission control protocol/Internet protocol ("TCP/IP") connection. One of skill in the art will recognize other configurations and functions of a host 102 that may communicate with a storage device 104 through a SCSI device driver 106 in response to data access requests of an application 110.

The system 100 includes a storage device 104 external to the host 102 and in communication with the host 102. The storage device 104 communicates with the host 102 through a SCSI device driver 106. The storage device 104 is typically a SCSI device and may be hard disk drive, a tape storage system, an optical drive, and the like. The storage device 104 communicates with the SCSI device driver 106 using SCSI commands and instructions. The storage device 104 may be connected directly to the host 102 or may be connected through other network components.

The host 102 includes a SCSI device driver 106 configured to communicate with the storage device 104. In one embodiment, the SCSI device driver 106 is a SCSI storage device driver. The SCSI device driver 106 typically receives data storage access requests and then sends SCSI commands and data to the storage device 104 that are compatible with the storage device 104. The SCSI device driver 106 receives data and data access responses from the storage device 104 and transmits the data and data access responses to the device or application 110 that made the request. Data access responses may include error messages, data status information, storage device access status information, etc.

In the present invention, in one embodiment the storage device 104 sends a notification, status, event identifier, etc. to the SCSI device driver 106 regarding an event. The event may be an error condition, a request for information, or other event that requires a response. An event, in one embodiment, is triggered by a data access request from an application 110. For example, an application 110 may send a data write command along with data to the storage device 104 though the SCSI device driver 106. If the storage device 104 is an encryption-enabled device, the storage device 104 requires an encryption key to store information and the application 110 may not have the encryption key.

In another embodiment, the storage device 104 may encounter an error as an event. The error event may be in response to a data access command from the application 110 or may be related to a hardware or software problem on the storage device 104. The application 110 and the host 102 may not have information or other means to respond to the event. The SCSI device driver 106 may also generate an event. Again, the application 110 and the host 102 may not have information or other means to respond to or handle the event. In any case, the event may require communication with a remote event manager 112 over a network.

The host 102 includes an event manager 108 that facilitates network communication with the remote event manager 112 over a TCP/IP connection when an event identifier ("ID") matches a listed event ID. The event manager 108 may communicate with one or more remote event managers 112 located on one or more computers 114. The event manager 108 may communicate with a second remote event manager 112 if a first remote event manager 112 fails or cannot be reached. The event manager 108 is described below in more detail.

The system 100 includes a remote event manager 112 running on a computer 114 and in communication with the host 102 and the event manager 108. In one embodiment, the system 100 includes multiple remote event managers 112 which may be configured to failover for redundancy. The remote event manager 112 may be a stand alone program or may be a portion of a program or module that communicates with another program or application. The remote event manager 112 may be an encryption key manager, an event logging application, an event handling application, etc.

The remote event manager 112 is configured to receive a request from the event manager 108 where the request pertains to an event generated by the storage device 104 or SCSI device driver 106. The remote event manager 112 is also configured to respond to the request and send the response to the event manager 108. For example, the response may include information, such as an encryption key or error information, or may include instructions and commands to resolve the event, such as a command to resolve an error condition.

The remote event manager 112, in one embodiment, is configured to exchange multiple requests and responses with the event manager 108. The remote event manager 112, in another embodiment, is configured to send in a response an instruction or command to resume the application 110, or in the alternative, to fail the application 110. The remote event manager 112, in one embodiment, is configured to exchange requests and responses in a TCP/IP format. In another embodiment, the remote event manager 112 is configured to exchange requests and responses in a format other than TCP/IP.

The remote event manager 112, in one embodiment, is located on a computer 114 in communication with the host 102. The computer 114 may be a client, a server, a workstation, a mainframe, a host, etc. In another embodiment, the remote event manager 112 is divided and resides on multiple computers 114. In one embodiment, the remote event manager 112 resides on the host 102 and communicates with the event manager 108 over a TCP/IP connection. One of skill in the art will recognize other ways that a remote event manager 112 may exchange requests and responses with an event manager 108.

The system 100, includes a computer network 116 configured to facilitate communication between the event manager 108 on the host 102 and the remote event manager 112 on the computer 114. The computer network 116 may include a local area network ("LAN"), a wide area network ("WAN"), a wireless network, the Internet, a SAN, etc. The computer network 116 may comprise a network of one type or may include networks of various types. The computer network 116 typically includes switches, routers, servers, etc. but may also be a wired connection between the host 102 and the computer 114. In one embodiment, the remote event manager 112 resides on the host 102 and the computer network 116 includes an internal network connection between the event manager 108 and the remote event manager 112. One of skill in the art will recognize other configurations of a computer network 116 capable of a TCP/IP connection between the event manager 108 and the remote event manager 112.

Figure 2:
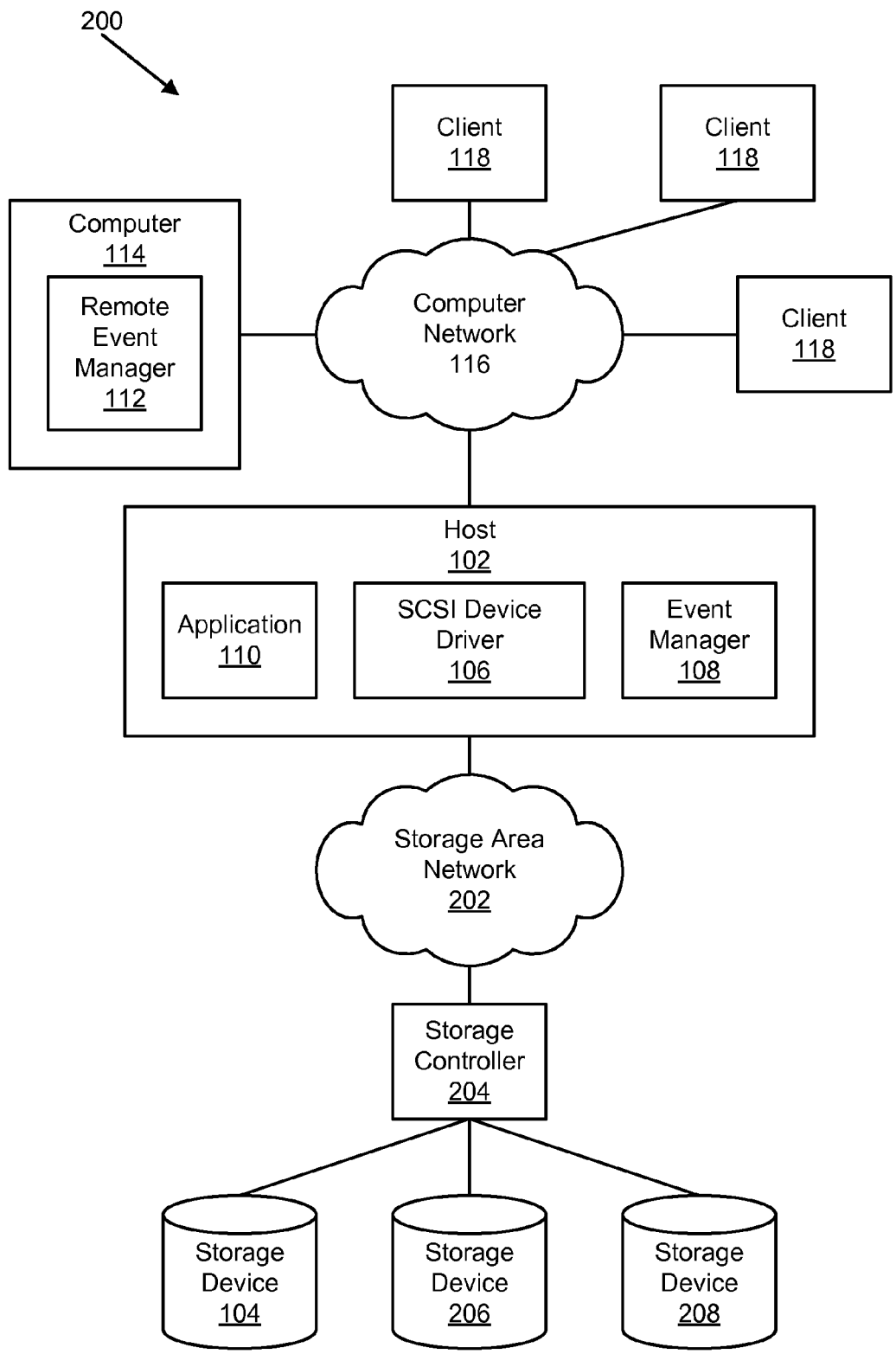
FIG. 2 is a schematic block diagram illustrating another embodiment of a system for providing a network interface to a SCSI device driver in accordance with the present invention.

FIG. 2 is a schematic block diagram illustrating another embodiment of a system 200 for providing a network interface to a SCSI device driver 106 in accordance with the present invention. The system 200 includes a host 102 with a SCSI device driver 106, an event manager 108, and an application 110, a storage device 104, a remote event manager 112 on a computer 114, a computer network 116, and one or more clients 118, all of which are substantially similar to those described in relation to the system 100 of FIG. 1. In addition, the system 200 includes a SAN 202, a storage controller 204, and storage devices 206, 208, which are described below.

The system 200 includes a SAN 202 configured to connect the host 102 to the storage device 104 through a storage controller 204. Typically the SAN 202 is a fiber channel network communicating using a fiber channel protocol ("FCP"). In another embodiment, the host 102 may communicate over the SAN 202 using Internet SCSI ("iSCSI") protocol. One of skill in the art will recognize other configurations of a SAN 202 configured to facilitate communication between a SCSI device driver 106 on the host 102 and the storage device 104.

The system 200, in one embodiment, includes a storage controller 204 configured to route communications between the host 102 and the storage device 104 over the SAN 202. In another embodiment, the host 102 acts as a storage controller 204 and communicates directly with the storage device 104 over the SAN 202. The storage controller 204 may include a server, a data mover, a tape storage library, etc. The storage controller 204 is typically connected to multiple storage devices 104, 206, 208. The storage controller 204, in one embodiment, acts as a RAID controller for storage devices 104, 206, 208 configured in a RAID array. The storage controller 204 may control one or more storage media types, such as hard disk drives, tape storage, optical disks, etc. and may include more than one controller. One of skill in the art will recognize other configurations of a storage controller 204 configured to facilitate routing of communication between a SCSI device driver 106 on the host 102 and the storage device 104.

In one embodiment, the application 110 communicates with the storage device 104 through the SCSI device driver 106, the SAN 202, and the storage controller 204. In another embodiment, an event is generated in the storage device 104, SCSI device driver 106, or other component of the SAN 202 or storage controller 204. In one embodiment, the event manager 108 detects an event ID associated with the event and compares it with listed event ID. If the event ID matches a listed event ID, the event manager 108 or SCSI device driver 106 suspends the application 110 and the event manager 108 sends a request to the remote event manager 112 over a TCP/IP connection. The event manager 108 then receives a response and either fails the application 110 or sends the response to the storage device 104 and resumes the application 110.

Figure 3:
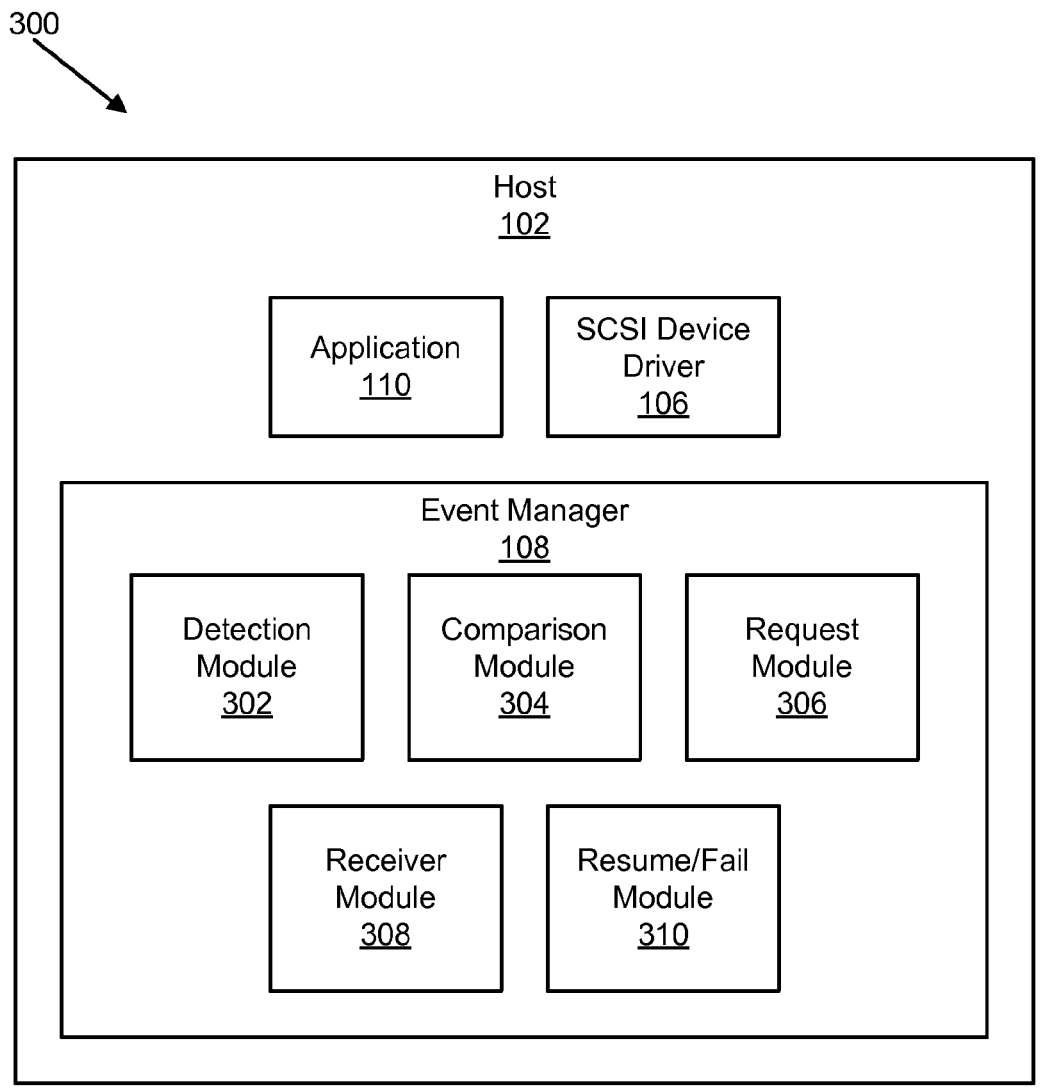
FIG. 3 is a schematic block diagram illustrating one embodiment of an apparatus for providing a network interface to a SCSI device driver in accordance with the present invention.

FIG. 3 is a schematic block diagram illustrating one embodiment of an apparatus 300 for providing a network interface to a SCSI device driver 106 in accordance with the present invention. The apparatus 300 includes a host 102 with an application 110, a SCSI device driver 106, and an event manager 108, which are substantially similar to those described in relation to the system 100 of FIG. 1 and the system 200 of FIG. 2. In addition, the event manager 108 includes a detection module 302, a comparison module 304, a request module 306, a receiver module 308, and a resume/fail module 310, which are described below.

The event manager 108 includes, in one embodiment, a detection module 302 that detects an event in the storage device 104 or the SCSI device driver 106 of the storage device 104. In another embodiment, the detection module 302 detects and event in the SAN 202 or the storage controller 204. The detection module 302, in one embodiment, detects an event by receiving an event ID. The event ID may be an error code or other code that signifies that the storage device 104, SCSI device driver 106, SAN 202, or storage controller 204 requires attention or more information. One of skill in the art will recognize other ways that the detection module 302 may detect an event.

The event manager 108 includes, in one embodiment, a comparison module 304 that compares an event ID associated with the event to a list of event IDs. In one embodiment, the list of event IDs are located in a table. In another embodiment, the list of event IDs are located in a database. One of skill in the art will recognize other ways that a finite list of event IDs may be stored. The comparison module 304 may include an address of a list, table, or other data structure that contains event IDs.

An event ID may be a number, a string of text, a combination of a number and text, etc. Typically, the listed event IDs are each matched with a request intended for the remote event manager 112. Detected events may also include event IDs that do not match listed event IDs. One of skill in the art will recognize other ways that the comparison module 304 may compare a detected event ID with listed event IDs. In one embodiment, the detection module 302 and the comparison module 304 are included in an event handler. The event handler with the detection module 302 and comparison module 304 may be in the event manager 108, the SCSI device driver 106, or both.

The event manager 108 includes a request module 306 that suspends the application 110 communicating with the storage device 104 through the SCSI device driver 106 and sends a request associated with the event to the remote event manager 112 over a TCP/IP connection. The request module 306 suspends the application 110 and sends the request in response to the comparison module 304 matching the event ID with a listed event ID. If the event ID does not match a listed event ID, the request module 306 takes no action, however, the application 110 or the host 102 may take action.

The request module 306, in one embodiment, suspends the application 110 after the application 110 sends a data access request to the storage device 104. For example, the application 110 may send data to be written to the storage device 104. If the storage device 104 is encryption-enabled, the request module 306 may suspend the application 110 and the data access request in the form of a write command until the storage device 104 receives an encryption key. Once the storage device 104 receives the encryption key, the application 110 and write command can be resumed to store the data. In another embodiment, suspending the application 110 suspends communication between the storage device 104 and the application 110. In yet another embodiment, suspending the application 110 suspends control of the storage device 104 by the application 110 so that control may temporarily be given the remote event manager 112. In another embodiment, the suspending an application 110 stops, halts, or shuts down an application 110. One of skill in the art will recognize other ways that the request module 306 may suspend an application 110.

The request module 306 also sends a request to the remote event manager 112 over a TCP/IP connection. The request may come from a table and associated with the event ID associated with the event. For example, one line of a table may include an entry with the event ID and another entry on the line may include the request. In one embodiment, the request comprises the event ID and the remote event manager 112 recognizes the event ID and an appropriate response. The request may include a request for information, an error code, an instruction, a command, etc. that the remote event manager 112 will recognize and respond. In another embodiment, the request module 306 sends a request over a connection other than a TCP/IP connection.

The event manager 108 includes a receiver module 308 that receives a response related to the event from the remote event manager 112 over a TCP/IP connection. In another embodiment, the receiver module 308 receives a response from the remote event manager 112 over a connection other than a TCP/IP connection. In one embodiment, the request module 306 and the receiver module 308 send and receive one or more requests and responses. In another embodiment, the receiver module 308 receives a response that includes a command or instruction to either resume the application 110 or fail the application 110. The response is typically related to the event; however, the receiver module 308 may receive other responses from the remote event manager 112. In one embodiment, the interaction between the remote event manager 112 and the event manager 108 through at least the request module 306 and the receiver module 308 comprise allowing the remote event manager 112 to control the storage device 104 through the SCSI device driver 106 while the application 110 is temporarily suspended and not controlling the storage device 104. One of skill in the art will recognize other ways that the receiver module 308 may receive responses to the event from the remote event manager 112.

The event manager 108, in one embodiment includes a resume/fail module 310 that resumes the application 110 after sending the response to the storage device 104 through the SCSI device driver 106 or fails the application 110. The resume/fail module 310 resumes or fails the application 110 based on the response received from the remote event manager 112.

In one embodiment, the resume/fail module 310 determines that the response from the remote event manager 112 is adequate to fulfill the needs of the storage device 104 or SCSI device driver 106 so the resume/fail module 310 sends the response to the storage device 104 through the SCSI device driver 106 and resumes the application 110. For example, if the request sent by the request module 306 is a request for an encryption key, the resume/fail module 310 may determine that the response includes an encryption key. The resume/fail module 310 sends the encryption key to the storage device 104 and resumes the application 110.

In another embodiment, the resume/fail module 310 determines that the response from the remote event manager 112 is inadequate and fails the application 110. For example, if the response from the remote event manager 112 does not contain an encryption key, contains the wrong encryption key, or contains a corrupted encryption key, the resume/fail module 310 fails the application 110.

In another embodiment, the resume/fail module 310 receives an instruction from the remote event manager 112 to resume the application 110. For example, the receiver module 308 may receive an encryption key and the resume/fail module 310 sends the encryption key to the storage device 104 through the SCSI device driver 106. The request module 304 may then send a request informing the remote event manager 112 that the encryption key has been received and is the correct key. The remote event manager 112 may then send a command or instruction to resume the application 110. The receiver module 308 receives the resume instruction and the resume/fail module 310 resumes the application 110.

In another embodiment, the encryption key may be defective or may be the wrong key. In such an embodiment the request module 306 may send a communication to the remote event manager 112 that there is a problem with the encryption key. The remote event manager 112 may then send an instruction or command to fail the application 110 and the resume/fail module 310 fails the application 110. One of skill in the art will recognize other ways that the resume/fail module 310 may resume or fail an application 110 and may send information or commands from a response to the storage device 104 through the SCSI device driver 106.

In one embodiment, the resume/fail module 310 restarts an application 110 that has been stopped. In another embodiment, the resume/fail module 310 reconnects an application 110 that has been disconnected. In another embodiment, the resume/fail module 310 signals a running application 110 that results are ready. One of skill in the art will recognize other ways that a resume/fail module 310 can restart, resume, reconnect, etc. an application 110 after the application 110 has been suspended, stopped, disconnected, etc. to communicate with a remote event manager 112.

Figure 4:
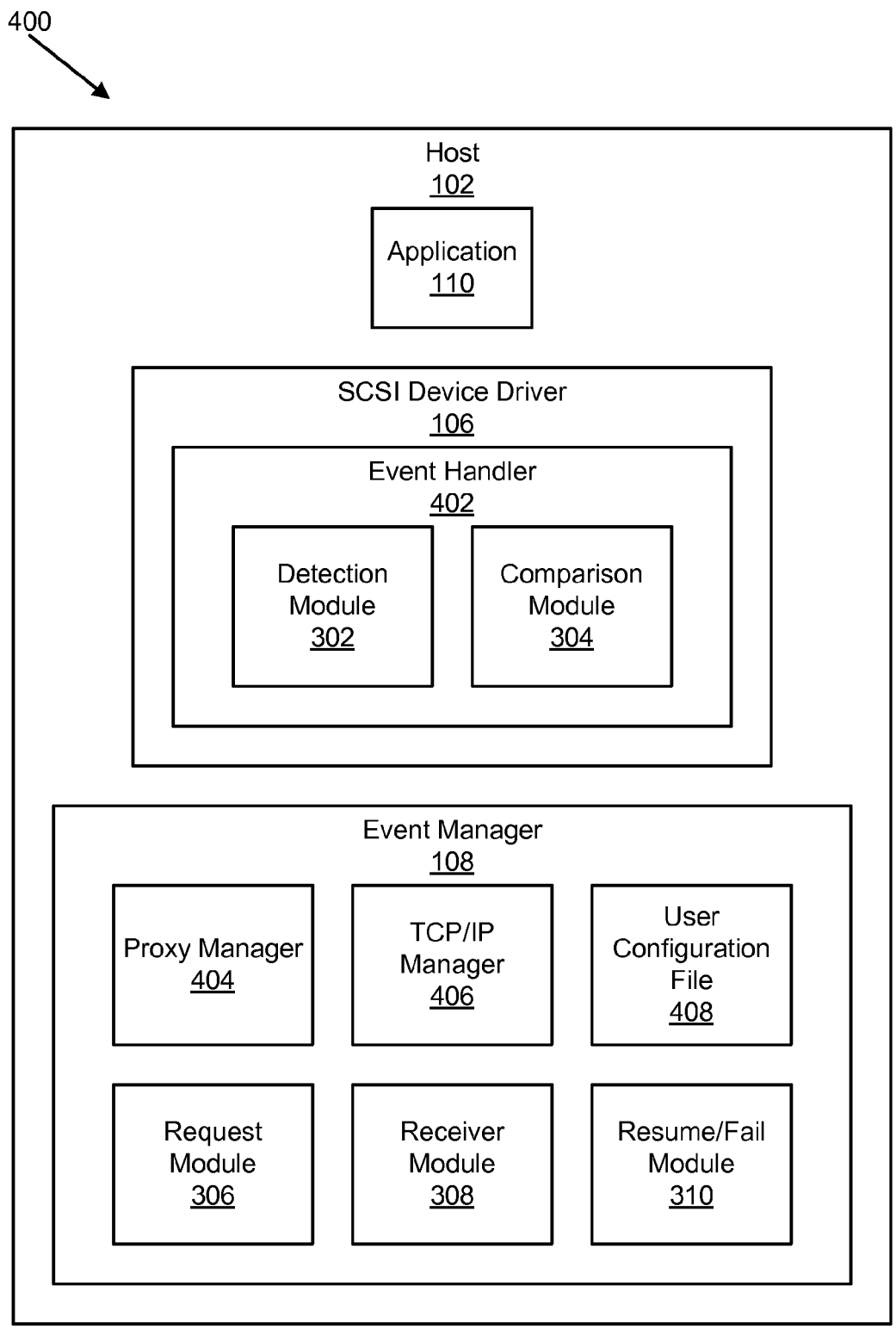
FIG. 4 is a schematic block diagram illustrating another embodiment of an apparatus for providing a network interface to a SCSI device driver in accordance with the present invention.

FIG. 4 is a schematic block diagram illustrating another embodiment of an apparatus 400 for providing a network interface to a SCSI device driver 106 in accordance with the present invention. The apparatus 400 includes a host 102 with an application 110, a SCSI device driver 106, and an event manager 108, which are substantially similar to those described in relation to the system 100 of FIG. 1 and the system 200 of FIG. 2. The apparatus 400 also includes a detection module 302, a comparison module 304, a request module 306, a receiver module 308, and a resume/fail module 310, which substantially similar to those described above in relation to the apparatus 300 of FIG. 3. In addition, the SCSI device driver 106 includes an event handler 402 with a detection module 302 and a comparison module 304, a proxy manager 404, a TCP/IP manager 406, and a user configuration file 408, which are described below.

In one embodiment, the SCSI device driver 106 includes an event handler 402. The event handler 402 includes the detection module 302 and the comparison module 304. The event handler 402 is configured to recognize and handle events generated by the SCSI device driver 106 and the storage device 104. In another embodiment, the event handler 402 is configured to handle events from the SAN 202 and the storage controller 204. The event handler 402 may handle events other than those with event IDs that are listed for a request and response from the remote event manager 112. The detection module 302 and the comparison module 304 are substantially similar in function to those described in relation to the apparatus 300 of FIG. 3, however, some of the functions may be in both the event manager 108 and the event handler 402.

The event manager 108 includes, in one embodiment, a proxy manager 404 and a TCP/IP manager 406. The proxy manager 404 is configured to communicate with the event handler 402, SCSI device driver 106, and the TCP/IP manager 406. In one embodiment, the proxy manager 404 receives notification from the event handler 402 and/or the comparison module 304 of an event with an event ID that matches the listed event IDs. The proxy manager 404 may signify completion, an adequate response from the remote event manager 112, etc. to the event handler 402, which then resumes the application 110 in conjunction with the resume/fail module 310.

The proxy manager 404 may receive status information and data from the SCSI device driver 106 and may send SCSI commands to the SCSI device driver 106. The SCSI commands may be part of a response from the remote event manager 112 or may be generated by the start/fail module 310 based on the received response. The proxy manager 404 may send requests to and receive responses from the TCP/IP manager 406. The requests may be in a SCSI format when sent to the TCP/IP manager 406 and may be then packaged for TCP/IP transmission by the TCP/IP manager 406. The proxy manager 404 may receive SCSI commands, instructions, data, etc. from the TCP/IP manager 406 in an "unwrapped" form where the TCP/IP formatting information is removed. The proxy manager 404 may include all or part of the functions of the request module 306, receiver module 308, and the resume/fail module 310. One of skill in the art will recognize other functions and requirements of a proxy manager 404.

The event manager 108, in one embodiment, includes a TCP/IP manager 406 that receives requests directed to the remote event manager 112, packages the requests for TCP/IP transmission, then sends the request to the remote event manager 112. The TCP/IP manager 406, in another embodiment, receives responses from the remote event manager 112, "unwraps" the response to remove TCP/IP transmission data, and then sends the response to the proxy manager 404. The TCP/IP manager 406 may manage an input/output ("I/O") device of the host 102 for sending and receiving data and commands over a TCP/IP connection. In one embodiment, the request module 306 packages request for TCP/IP connection and sends the request to TCP/IP manager 406 for transmission and the TCP/IP manager 406 sends received responses to the receiver module 308 and the receiver module 308 or resume/fail module 310 un-packages the responses to remove TCP/IP parameters.

In one embodiment, the TCP/IP manager 406 accesses a network address and other transmission information from a user configuration file 408. The user configuration file 408, in one embodiment, includes address information for one or more remote event manager 112. In another embodiment, the user configuration file 408 includes preference information as to which remote event manager 112 that may be accessed in what order. For example, the user configuration file 408 may list a first remote event manager 112 as a primary contact and a second remote event manager 112 as a backup contact in case the first remote event manager 112 is unavailable. One of skill in the art will recognize other contents and uses of a user configuration file 408.

The TCP/IP manager 406, in one embodiment manages which remote event manager 112 is sent a request. For example, the TCP/IP manager 406 may send a request to a first remote event manager 112 or may attempt to connect to the first remote event manager 112. If the TCP/IP manager 406 determines the first remote event manager 112 is unavailable, the TCP/IP manager 406 may then attempt to connect to or send a request to a second remote event manager 112. In another embodiment, the TCP/IP manager 406 is not part of the event manager 108, but is a generic manager of the host 102 for packaging and un-packaging data and commands for TCP/IP transmission. The TCP/IP manager 406 may include some or all of the functions of the request module 306 and receiver module 308. One of skill in the art will recognize other requirements and functions of a TCP/IP manager 406 that manages TCP/IP connections to remote event managers 112.

Figure 5:
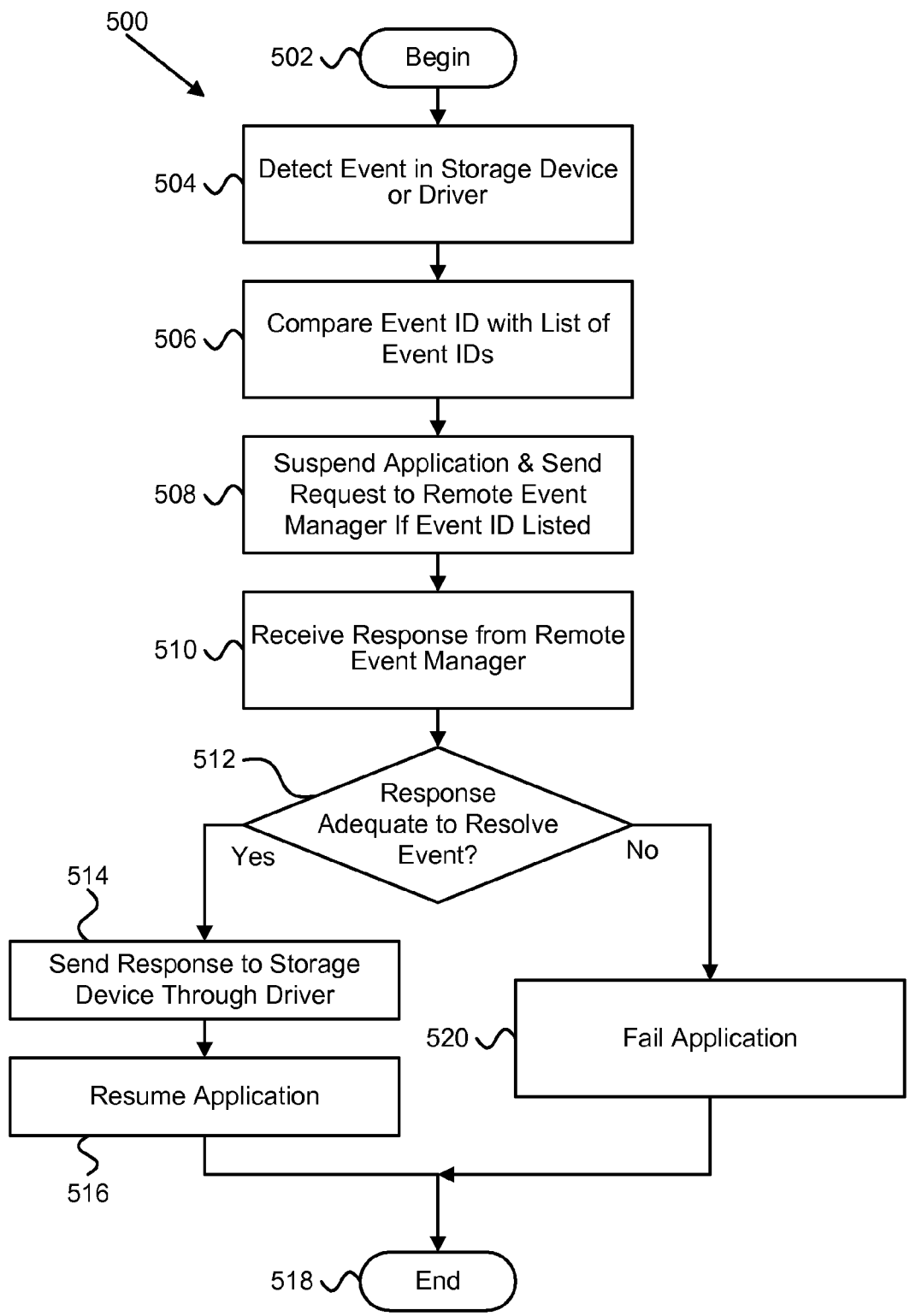
FIG. 5 is a schematic flow chart diagram illustrating one embodiment of a method for providing a network interface to a SCSI device driver in accordance with the present invention.

FIG. 5 is a schematic flow chart diagram illustrating one embodiment of a method 500 for providing a network interface to a SCSI device driver 106 in accordance with the present invention. The method 500 begins 502 and the detection module 302 detects 504 an event in the storage device 104 or the SCSI device driver 106 of the storage device 104. The comparison module 304 compares 506 an event identifier associated with the event to a list of event identifiers. The detection module 302 and the comparison module 304 may be included in the event handler 402, event manager 108, or the SCSI device driver 106.

The request module 306 suspends 508 the application 110 and sends 508 a request associated with the event to the remote event manager 112 over a TCP/IP connection if an event ID associated with the event matches a listed event ID. The listed event ID may be part of a list, a table, or other data structure. The request is typically coordinated with the event ID of the event. The TCP/IP manager 406 may package the request in a TCP/IP format for transmission. The receiver module 308 receives 510 a response from the remote event manager 112. The response may be received by the TCP/IP manager 406 and stripped of TCP/IP transmission parameters before being sent to the receiver module 308.

The resume/fail module 310 determines 512 if the response is adequate to resolve the event. If the resume/fail module 310 determines 512 that the response is adequate to resolve the event, the resume/fail module 310 sends 514 the response to the storage device 104 through the SCSI device driver 106 and resumes 516 the application 110 and the method 500 ends 518. If the resume/fail module 310 determines 512 that the response is inadequate to resolve the event, the resume/fail module 310 fails 520 the application 110 and the method 500 ends 518.

Figure 6:
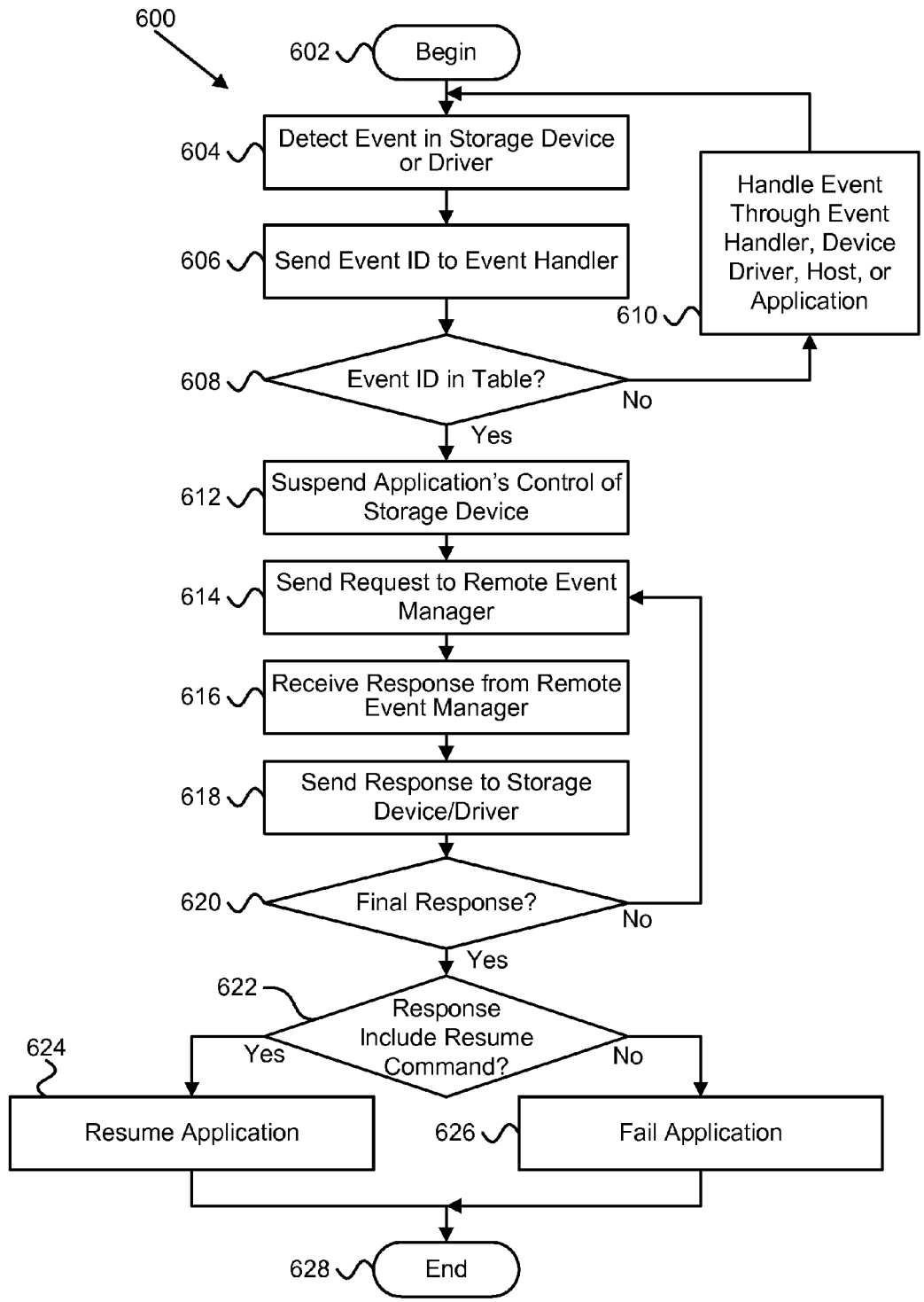
FIG. 6 is a schematic flow chart diagram illustrating another embodiment of a method for providing a network interface to a SCSI device driver in accordance with the present invention.

FIG. 6 is a schematic flow chart diagram illustrating another embodiment of a method 600 for providing a network interface to a SCSI device driver 106 in accordance with the present invention. The method 600 begins 602 and the detection module 302 detects 604 an event in the storage device 104 or the SCSI device driver 106 of the storage device 104. In another embodiment, the detection module 302 detects 604 an event in the SAN 202 or storage controller 204. The comparison module 304 compares 606 an event identifier associated with the event to a list of event identifiers. The detection module 302 and the comparison module 304 may be included in the event handler 402, event manager 108, or the SCSI device driver 106.

The comparison module 304 determines 608 if the event ID is listed in an event ID table. If the comparison module 304 determines 608 that the event ID is not listed in an event ID table, the event handler 402, SCSI device driver 106, host 102, or application 110 handles 610 the event. If the comparison module 304 determines 608 that the event ID is listed in the event ID table, the request module 306 suspends 612 the application 110 and sends 614 a request associated with the event to the remote event manager 112 over a TCP/IP connection. The receiver module 308 receives 616 a response from the remote event manager 112. In one embodiment, the resume/fail module 310 sends 618 the response to the storage device 104 through the SCSI device driver 106.

In one embodiment, the resume/fail module 310 determines 620 if a final response has been received. Determining 620 if a final response is received may include determining 620 if a response includes a notification that the response is final, includes a resume command, or the like. If the resume/fail module 310 determines 620 that a final response has not been received, the request module 306 sends 614 another request to the remote event manager 112, the receiver module 308 receives 616 another response from the remote event manager 112, and, optionally, the resume/fail module 310 sends 618 the response to the storage device 104. If the resume/fail module 310 determines 620 that a final response has been received, the resume/fail module 310 determines 622 if the response includes a resume command or similar instruction from the remote event manager 112. If the resume/fail module 310 determines 622 that the response includes a resume command from the remote event manager 112, the resume/fail module 310 resumes 624 the application 110 and the method 600 ends 626.

If the resume/fail module 310 determines 622 that the response does not include a resume command from the remote event manager 112, the resume/fail module 310 fails 628 the application 110 and the method 600 ends 626. In one embodiment, the resume/fail module 310 simultaneously determines 620 that a final response has not been required and determines 620 if the response includes a resume or fail command because receiving a resume or fail command in a response may be used to determine 620 that the response is final.

For example, a second or subsequent request may comprise an acknowledgement that a response has been received. In which case, the remote event manager 112 may then send either a resume or fail command. The resume/fail module 310 may then simultaneously determine 620, 622 a response if final and if the response includes a resume command. One of skill in the art will recognize other ways that a resume/fail module 310 may determine 620, 622 if a response is final and if the resume/fail module 310 should resume 624 or fail 628 an application 110.

Beneficially the present invention solves the problems of the prior art by allowing an application 110 in communication with a storage device 104 through a SCSI device driver 106 to be interrupted and for a remote event manager 112 over a TCP/IP connection to control the storage device 104 in order to resolve a problem or supply the storage device 104 with needed information. The present invention overcomes a need to modify the storage device 104 or add other hardware to add the ability to interrupt an application 110 and solve a problem or to supply information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable medium having computer usable program code programmed for providing a network interface to a small computer system interface ("SCSI") storage device driver, the operations of the computer program product comprising:
   detecting an event in one of a storage device and a SCSI device driver of the storage device;
   comparing an event identifier associated with the event to a list of event identifiers;
   suspending an application in communication with the storage device through the SCSI device driver and sending a request associated with the event to a remote event manager over a transaction control protocol/Internet protocol ("TCP/IP") connection, each in response to the event identifier matching a listed event identifier;
   receiving a response related to the event from the remote event manager over a TCP/IP connection; and
   one of sending the response to the storage device through the SCSI device driver, resuming the application, and failing the application.

2. The computer program product of claim 1, wherein the event is in response to a communication between the application and one of the storage device and the SCSI device driver.

3. The computer program product of claim 1, wherein the request comprises an error message.

4. The computer program product of claim 3, wherein the response from the remote event manager further comprises a response to the error message.

5. The computer program product of claim 1, wherein the request comprises an information request for information unavailable from the SCSI device driver.

6. The computer program product of claim 5, wherein the information request comprises a request for an encryption key and the remote event manager comprises an encryption key manager capable of supplying the encryption key to the storage device.

7. The computer program product of claim 1, wherein the listed event identifier comprises an entry in a table.

8. The computer program product of claim 1, wherein sending request associated with the event to a remote event manager further comprises encoding the request in a format compatible with TCP/IP.

9. The computer program product of claim 1, wherein sending a request and receiving a response from the remote event manager further comprises sending a plurality of requests and receiving a plurality of corresponding instructions and data from the remote event manager over a TCP/IP connection, the instructions and data directed to the storage device through the SCSI device driver.

10. The computer program product of claim 9, wherein receiving a plurality of instructions and data from the remote event manager further comprises receiving one of an instruction to resume the application and an instruction to fail the application.

11. An apparatus comprising non-transitory computer readable media to provide a network interface to a small computer system interface ("SCSI") storage device driver, the apparatus comprising:
   a detection module configured to detect an event in one of a storage device and a SCSI device driver of the storage device;
   a comparison module configured to compare an event identifier associated with the event to a list of event identifiers;
   a request module configured to suspend an application communicating with the storage device through the SCSI device driver and to send a request associated with the event to a remote event manager over a transaction control protocol/Internet protocol ("TCP/IP") connection, each in response to the comparison module matching the event identifier with a listed event identifier;
   a receiver module configured to receive a response related to the event from the remote event manager over a TCP/IP connection; and
   a resume/fail module configured to resume the application after sending the response to the storage device through the SCSI device driver or to fail the application, each in response to the response received from the remote event manager.

12. The apparatus of claim 11, further comprising a TCP/IP manager configured to receive the request in a SCSI format and to send the request to the remote event manager in a TCP/IP format.

13. The apparatus of claim 11, wherein the request module is further configured to retrieve a network address of the event handling file from a user configuration file.

14. The apparatus of claim 11, wherein the SCSI device driver comprises an event handler that includes the detection module and the comparison module.

15. A system to provide a network interface to a small computer system interface ("SCSI") storage device driver, the system comprising:
   a computer network;
   a storage device;
   a remote event manager; and
   a host in communication with the storage device through a SCSI device driver and in communication with the remote event manager through the computer network, the host comprising
      a detection module configured to detect an event in one of the storage device and the SCSI device driver;
      a comparison module configured to compare an event identifier associated with the event to a list of event identifiers;
      a request module configured to suspend an application in communication with the storage device through the SCSI device driver and to send a request associated with the event to the remote event manager over a transaction control protocol/Internet protocol ("TCP/IP") connection, each in response to the comparison module matching the event identifier with a listed event identifier;
      a receiver module configured to receive a response related to the event from the remote event manager over a TCP/IP connection; and
      a resume/fail module configured to resume the application after sending the response to the storage device through the SCSI device driver or to fail the application, each in response to the response received from the remote event manager.

16. The system of claim 15, wherein the host communicates with the storage device over a fiber channel protocol ("FCP") connection.

17. The system of claim 15, wherein the host communicates with the storage device over an Internet SCSI ("iSCSI") connection.

18. The system of claim 15, wherein the application resides on one of the host and a computer in communication with the host.

19. The system of claim 15, wherein the remote event manager resides on the host.

20. A method for deploying network interface computer code for providing a network interface to a small computer system interface ("SCSI") storage device driver, the method comprising:

determining customer requirements for extending a device driver to facilitate a network connection to a remote event manager;

deploying network interface computer code comprising detecting an event in one of a storage device and a SCSI device driver of the storage device;

comparing an event identifier associated with the event to a list of event identifiers;

suspending an application in communication with the storage device through the SCSI device driver and sending a request associated with the event to the remote event manager over a transaction control protocol/Internet protocol ("TCP/IP") connection, each in response to the event identifier matching a listed event identifier;

receiving a response related to the event from the remote event manager over a TCP/IP connection; and one of sending the response to the storage device through the SCSI device driver, resuming the application, and failing the application.

* * * * *